United States Patent [19]

Campbell, Jr. et al.

[11] Patent Number: 5,077,367

[45] Date of Patent: Dec. 31, 1991

[54] CRYSTALLINE SYNDIOTACTIC COPOLYMERS FROM ARYLCYCLOBUTENE FUNCTIONAL MONOMERS AND VINYL AROMATIC MONOMERS

[75] Inventors: Richard E. Campbell, Jr.; Robert A. DeVries, both of Midland, Mich.

[73] Assignee: The Dow Chemical Company, Midland, Mich.

[21] Appl. No.: 541,455

[22] Filed: Jun. 22, 1990

Related U.S. Application Data

[63] Continuation-in-part of Ser. No. 414,842, Sep. 29, 1989, abandoned.

[51] Int. Cl.$^5$ .................................. C08F 212/08
[52] U.S. Cl. ................................ 526/284; 526/160; 526/265; 526/274; 526/280; 526/902; 525/203; 525/210; 525/242; 525/333.3; 528/503
[58] Field of Search ............... 526/160, 280, 284, 347, 526/265, 274; 525/333.3, 210, 203, 242; 528/481, 503

[56] References Cited

U.S. PATENT DOCUMENTS

| | | | |
|---|---|---|---|
| 3,335,121 | 8/1967 | Natta et al. | 526/351 X |
| 4,540,763 | 9/1985 | Kirchhoff | 584/24 |
| 4,570,011 | 2/1986 | So | 560/410.5 |
| 4,667,004 | 5/1987 | Wong | 526/159 |
| 4,667,005 | 5/1987 | Wong | 526/159 |

OTHER PUBLICATIONS

Hackh's Chemical Dictionary, J. Grant (ed.) McGraw-Hill, Inc., N.Y., 62, 1969.

*Primary Examiner*—Fred Teskin

[57] ABSTRACT

Syndiotactic homopolymers of an arylcyclobutene functional monomer and syndiotactic copolymers of an arylcyclobutene functional monomer and a vinylaromatic monomer are prepared by conducting the polymerization in the presence of a catalytic amount of a suitable coordination catalyst such as the reaction product of polymethylaluminoxane and a transition metal compound.

17 Claims, No Drawings

CRYSTALLINE SYNDIOTACTIC COPOLYMERS FROM ARYLCYCLOBUTENE FUNCTIONAL MONOMERS AND VINYL AROMATIC MONOMERS

CROSS-REFERENCE TO RELATED APPLICATION

This is a continuation-in-part of application Ser. No. 414,842 filed Sept. 29, 1989, now abandoned.

BACKGROUND OF THE INVENTION

This invention relates to homopolymers of arylcyclobutene functional monomers and copolymers of arylcyclobutene functional monomers with vinylaromatic monomers having a high degree of syndiotacticity. This invention also relates to a process for preparing such polymers and a polymeric composition comprising such polymers. The introduction of arylcyclobutene groups into these polymers allows such polymers to undergo ring opening, crosslinking and grafting reactions when heated. The resulting products have improved physical properties such as char formation, softening point, and solvent and wear resistance. The polymers of the present invention may be employed as synthetic polymers in typical plastics operations such as in producing extruded and molded parts.

In U.S. Pat. No. 4,540,763, poly(arylcyclobutene) polymers are disclosed. The polymers are prepared by subjecting poly(arylcyclobutene) compounds to ring-opening conditions such as heat and linking the compounds together through such opened rings. The polymers so formed exhibit excellent physical properties, such as high thermal stability, low dielectric constant, and low moisture and solvent absorption. Because of such properties, the polymers are useful in preparing composites, and in several electronics applications.

U.S. Pat. No. 4,667,004 discloses solid homopolymers of an olefinic benzocyclobutene monomer. U.S. Pat. No. 4,667,005 discloses crystalline alphamonoolefin copolymers of $C_{2-8}$ alphamonoolefins and an olefinic benzocyclobutene monomer.

U.S. Pat. No. 4,680,353 teaches a process for the preparation of polymers of vinyl aromatic monomers having a stereoregular structure of high syndiotacticity by the use of coordination catalysts, particularly catalysts comprising a certain transition metal compound and a polyalkylaluminoxane. Other coordination catalysts for the preparation of syndiotactic polystyrene are disclosed in U.S. Pat. Nos. 4,680,353, 4,774,301 and 4,808,680; EP's 271,874 and 271,875; and copending U.S. patent application Ser. No. 64,282, filed June 17, 1987. For the teachings contained therein, the above references are incorporated in their entirety by reference thereto.

The present invention is directed to a new class of polymers having a stereoregular structure of high syndiotacticity which are capable of crosslinking thereby imparting new and improved properties to such polymers.

SUMMARY OF THE INVENTION

According to the present invention there is now provided a polymer comprising the reaction product of one or more arylcyclobutene functional monomers having a high degree of syndiotactic stereoregularity. The syndiotactic polymers of the present invention may be a homopolymer of an arylcyclobutene functional monomer or a copolymer of one or more arylcyclobutene functional monomers and one or more vinylaromatic monomers.

Another aspect of the present invention pertains to a process for preparing the above polymers, which comprises contacting one or more arylcyclobutene functional monomers optionally in the presence of one or more vinylaromatic monomers with a catalytically effective amount of a suitable catalyst such as a catalyst comprising the reaction product of a transition metal compound and polyalkylaluminoxane under reaction conditions so as to prepare the above polymers.

A final aspect of the present invention is a polymeric composition comprising the above polymer as well as molded objects prepared therefrom including crosslinked derivatives thereof.

DETAILED DESCRIPTION OF THE INVENTION

Preferred polymers according to the present invention are those which have a stereoregular structure of greater than 50 percent syndiotactic of a racemic triad as determined by $C^{13}$ nuclear magnetic resonance spectroscopy. Such polymers may be usefully employed in the preparation of articles and objects (e.g., via compression molding or other suitable technique) having an extremely high resistance to deformation due to the effects of temperature.

The arylcyclobutene functional monomers useful in this invention contain an aryl moiety having adjacent ring carbons thereof covalently bonded to one or more 1,2-ethanediyl or substituted ethanediyl groups. The 1,2-ethanediyl group together with the 2 aromatic carbons of the aryl group collectively form a four membered ring system having some physical properties similar to a cyclobutene group, thereby resulting in the title "aryloyclobutene". Elsewhere in the monomer is a polymerizable functional group which may suitably be polymerized or copolymerized with the vinylaromatic monomer under Ziegler Natta polymerization conditions. Preferred are substituted arylcyclobutene functional monomers wherein the substituent is an ethylenically unsaturated moiety. Highly preferably, the ethylenically unsaturated moiety is bonded to the monomer at a meta position from at least one of the aryl carbon atoms from the cyclobutene ring. Aryl moieties are monovalent derivatives of aromatic compounds containing $(4N+2)n$ electrons as described in Morrison & Boyd, *Organic Chemistry*, 3rd ed., 1973. Suitable aryl moieties include benzene, naphthalene, phenanthrene, anthracene, pyridine, and compounds containing two or more such aromatic moieties bridged by a covalent bond or by alkylene, cycloalkylene, or other moieties. The aryl moiety can be substituted with a variety of electron-donating and electron-withdrawing moieties, which will further be defined. Preferred aryl moieties are phenyl, naphthyl, biphenyl, binaphthyl, phenyl alkenyl benzene, or phenyl cycloalkenyl benzene. The most preferred aryl moiety is phenyl.

Electron-donating moieties are those which donate electrons more than hydrogen would if occupying the same site. Electron-withdrawing moieties are groups which more readily withdraw an electron relative to a hydrogen atom. Examples of suitable electron-withdrawing moieties include $-NO_2$, $-CN$, Br, I, Cl, F, $-PR''_2$, $-CO_2H$, $-COR''$, $-CO_2R''$, $-SOR''$ and $-SO_2R''$ wherein $R''$ is hydrogen or hydrocarbyl.

Examples of suitable electron-donating groups include R", OR", SR" or NR" wherein R" is hydrogen or hydrocarbyl. Hydrocarbyl refers to any organic moiety containing carbon and hydrogen atoms.

The arylcyclobutene functional monomers can also contain one or more heteroatoms, such as oxygen, nitrogen, phosphorus, silicon and sulfur, or an organic moiety containing one or more aromatic or aliphatic moieties.

The arylcyclobutene functional monomers useful in this invention contain at least one arylcyclobutene moiety, and preferably contain only one arylcyclobutene moiety. Methods of making arylcyclobutene functional monomers are known, and are disclosed in U.S. Pat. Nos. 4,851,603; 4,822,930; 4,540,763; 4,562,280 and 4,570,011, which are all herein incorporated by reference.

Preferred arylcyclobutene functional monomers for use according to the present invention correspond to the formula:

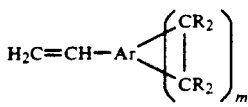

wherein Ar is an aryl moiety, or a halogen or $C_{1-6}$ alkyl substituted aryl moiety: R is hydrogen, an electron-donating moiety or an electron-withdrawing moiety as previously defined; and m is an integer of at least 1.

The most preferred arylcyclobutene functional monomer is 4-vinylbenzocyclobutene represented by the formula:

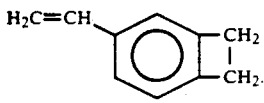

The arylcyclobutene functional monomers can be prepared by reacting a suitably substituted arylcyclobutene compound with a molecular compound containing both the desired reactive functionality especially alkenyl unsaturation and a moiety which is reactive with the substituent of the substituted arylcyclobutene.

Suitable vinylaromatic monomers which can be used in the process of the present invention include those represented by the formula:

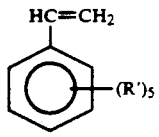

wherein each R' is independently hydrogen: an aliphatic, cycloaliphatic or aromatic hydrocarbon group having from 1 to 10, more suitably from 1 to 6, most suitably from 1 to 4, carbon atoms; or a halogen atom. Examples of such monomers include, styrene, chlorostyrene, n-butyl styrene, p-vinyl toluene, bromostyrene, etc., with styrene being especially suitable.

The polymerization reaction may be conducted in the presence of a coordination catalyst comprising a transition metal compound and polyakylaluminoxane or other suitable coordination catalysts such as the catalyst as disclosed Copending U.S. patent application, titled Metal Complex Compounds, filed Sept. 14, 1989 by James C. Stevens, et al.

The polyalkylaluminoxane, also known as alkylaluminoxane or simply aluminoxane used with the first class of catalysts, may be prepared according to any known technique. One such technique includes the reaction of a trialkylaluminum, especially trimethylaluminum, and a hydrated metal salt as disclosed by Kaminsky in U.S. Pat. No. 4,544,762, the teachings of which are herein incorporated in their entirety by reference thereto. An additional method is disclosed in co-pending U.S. patent application Ser. No. 91,566, filed Aug. 31, 1987. For purposes of calculating the atomic ratio of aluminum:transition metal in the catalysts of the present invention the repeat unit molecular weight of the polymethylaluminoxane is assumed to be 58.

All transition metal compounds previously known to be usefully employed in the preparation of polymerization coordination catalysts may be employed in the present invention. Such transition metal compounds are described in U.S. Pat. Nos. 4,680,353 and 4,774,301: EP's 271,874 and 271,875; and copending U.S. patent applications Ser. Nos. 59,304, filed June 8, 1987, and 64,282, filed June 17, 1987, the teachings of which are herein incorporated in their entirety by reference thereto. Suitable transition metal compounds include titanium containing compounds such as titanium tetraalkyls, monocyclopentadienyl titanium trialkyls such as cyclopentadienyl titanium trimethyl, biscyclopentadienyl titanium dichloride, monocyclopentadienyl titanium trichloride, titanium tetra n-butoxide and cyclopentadienyl titanium triphenoxide; and zirconium containing compounds such as zirconium tetraalkyls, zirconium trialkyls, monocyclopentadienyl zirconium trialkyls, monocyclopentadienyl zirconium trialkoxides, biscyclopentadienyl zirconium dichloride, monocyclopentadienyl zirconium trichloride, zirconium tetra n-butoxide and cyclopentadienyl zirconium triphenoxide. Highly preferred transition metal compounds are titanium tetraalkyls or tetraalkoxides and monocyclopentadienyl titanium trialkyls or trialkoxides having from 1 to 6 carbons in the alkyl or alkoxide group, titanium tetraphenoxides and monocyclopentadienyl titanium triphenoxides. It is understood that the transition metal compound may also be employed in the form of a precursor that is capable of generating the desired transition metal complex in situ. For example transition metal complexes may be used which incorporate one or more molecules of any nature in the crystal structure in addition to the transition metal compound, such as transition metal complexes containing alcohol molecules associated with the crystal structure via Van der Waals forces. Most preferred compounds are monocyclopentadienyl or pentamethyl monocyclopentadienyl titanium-trialkoxides and triphenoxides.

In the preparation of the catalyst composition comprising a transition metal complex and polyalkylaluminoxane, the two components can be combined in any order. The catalyst components may be suitably mixed in an inert atmosphere comprising nitrogen, argon, xenon, or combinations thereof. The components are mixed at any suitable temperature, preferably from 0° C. to 100° C., more suitably 20° C. to 70° C.

The catalyst is normally formed in the presence of an aliphatic, cycloaliphatic or aromatic solvent or a combination of such solvents. The components are employed in quantities which provide an atomic ratio of Al:transition metal suitably from 5:1 to 50,000:1, more suitably from 20:1 to 10,000:1, most suitably from 100:1 to 1000:1. Once the catalyst is prepared it is recovered from solution and may be deposited onto an inert carrier such as silica to form a supported catalyst.

The catalyst disclosed in the copending U.S. patent application filed Sept. 14, 1989 by James C. Stevens et al., that may also be employed in the present process is a monocyclopentadienyl or substituted monocyclopentadienyl metal complex containing compound. The catalyst compound is represented by the formula:

$CpMX_n^+ A^-$ wherein:

Cp is a single $\eta^5$-cyclopentadienyl or $\eta^5$-substituted cyclopentadienyl group optionally covalently bonded to M through a substituent:

M is a meal of Group IIIB, IVB, VB, VIB, VIII or the Lanthanide Series of the Periodic Table (as contained in the Chemical Rubber Handbook, CRC Press, 1985) bound in an $\eta^5$ bonding mode to the cyclopentadienyl or substituted cyclopentadienyl group:

X is independently each occurrence halo, alkyl, aryl, N—$R_2$, aryloxy or alkoxy of up to 20 carbons;

R is alkyl or aryl of up to 10 carbons:

n is one or two depending on the valence of M: and

A is a noncoordinating, compatible anion of a Bronsted acid salt. For the teachings contained therein the aforementioned copending U.S. patent applications are herein incorporated in their entirety by reference thereto.

The polymerization process to prepare the polymers of the present invention may be conducted at temperatures of from 0° C. to 120° C., preferably from 30° C. to 80° C., for a time sufficient to produce the desired polymer. Typical reaction times are from one minute to 100 hours, preferably from 5 minutes to 20 hours, more preferably from 1 to 10 hours. The optimum time will vary depending upon the temperature, solvent and other reaction conditions employed. The polymerization is preferably conducted under slurry, bulk or suspension polymerization conditions.

The polymerization can be conducted at subatmospheric pressure as well as superatmospheric pressure, suitably at reduced pressures such that the lowest boiling component(s) of the polymerization mixture does not vaporize up to 1000 psig (6895 kPa). However, it is preferable that near atmospheric pressure or low pressures such as 1-5 psig (6.90-34.48 kPa) be employed because of lower capital and equipment costs.

The polymerization may be conducted in the presence of an inert diluent or without such diluent (i.e. in the presence of excess monomer). Examples include aliphatic hydrocarbons such as heptane and octane, cycloaliphatic hydrocarbons such as cyclohexane, methylcyclohexane and decalin, aromatic hydrocarbons such as benzene and toluene, halogenated aromatic hydrocarbons, as well as mixtures thereof. Preferred diluents comprise the $C_{4-20}$ alkanes, especially branched chain alkanes, toluene and mixtures thereof. A particularly desirable diluent for the polymerization is iso-octane, iso-nonane or blends thereof such as Isopar-E ®, available from Exxon Chemical Inc. Where employed an amount of solvent is used to provide a monomer concentration from 5 percent to 100 percent by weight. During the polymerization, polymer may precipitate from the reaction mixture as it is formed.

As in other similar polymerizations it is highly desirable that the monomers and solvents employed be of sufficiently high purity that catalyst deactivation does not occur. Any suitable technique for monomer purification such as devolatilization at reduced pressures, contacting with molecular sieves or high surface area alumina, deaeration, etc., may be employed.

Purification of the resulting polymer to remove entrained catalyst may also be desired by the practitioner. Entrained catalyst may generally be identified by residues of ash on pyrolysis of the polymer that are attributable to residual catalyst. A suitable technique for removing such compounds is by solvent extraction, e.g., extraction utilizing hot, high boiling chlorinated solvents, acids or bases such as caustic followed by filtration.

The copolymer of the present invention preferably comprises 99.999 to 50, most preferably 9.995 to 95, mole percent of vinylaromatic monomer and 0.001 to 50, most preferably 0.005 to 5, mole percent of the arylcyclobutene functional monomer in polymerized form. By controlling the timing of monomer addition completely random copolymers or copolymers having nearly a block configuration may be prepared.

The reactant monomers (vinylarylcyclobutene and styrene or its derivative) and the catalyst are employed in quantities which provide a molar ratio of reactant monomers: transition metal of from 100:1 to 350,000:1, suitably from 10,000:1 to 200,000:1, more suitably from 50,000:1 to 200,000:1. At ratios above 350,000:1, the conversion becomes too low, while at ratios below 100:1, the catalyst is not allowed to have its full reactive impact.

The pendant arylcyclobutene group of the polymers of the present invention provides a means for providing latent polymerization ability. It is believed, without wishing to be bound thereby, that the pendant arylcyclobutene moiety can ring open thereby forming crosslinked structures or extract a hydrogen moiety from the polymer chain thereby leading to interchain grafting. Such a mechanism is useful in crosslinking the polymeric composition and for grafting other monomers or polymers to the vinyl polymeric composition. Suitable grafting compositions are monomers and polymers which contain additional polymerization reaction sites under ring-opening conditions, such as other compositions containing reactive arylcyclobutene moieties, and compositions which exhibit dienophilic behavior.

The polymeric compositions of this invention are also useful in preparing advanced polymeric compositions wherein the polymers are linked through the arylcyclobutene moieties. Other compositions which can undergo addition polymerization reactions under the ring-opening conditions can also be included in the polymeric composition. Examples of suitable polymerizable moieties are other ethylenically unsaturated moieties, acetylenic moieties, and polymers containing arylcyclobutene moieties. For example, the polymers of the invention may be blended with additional polymers and exposed to elevated temperatures or other suitable conditions to cause reaction between the polymerizable moieties. This procedure is known in the art as reactive blending. The arylcyclobutene moiety can undergo simple addition polymerization reactions as well as Diels-Alder-type reactions. Mechanisms of these reactions are described in U.S. Pat. No. 4,540,763 and copending U.S. patent application Ser. No. 872,334, filed June 9, 1986.

Generally ring opening is occasioned by heating a mixture comprising the polymers of the present invention to a temperature suitable for effecting the crosslinking reaction. Suitable temperatures may vary depending on the specific arylcyclobutene moiety and the other components of the mixture. Preferred reaction temperatures are from 100° C to 320° C, more preferably from 150° C. to 250° C. Upon ring opening, crosslinking or reaction with suitable polymerizable functionality of the remaining ingredients of the reaction mixture readily occurs. In addition to the reactive components of the reaction mixture, inert additives, reinforcing aids, glass, fibers, woven and nonwoven cloth, fillers, pigments, impact modifiers, etc. may be included if desired. Such additives may be incorporated with the polymer in a dry or molten form and exposure to elevated temperatures results in the formation of a suitable thermosetting composition due to the crosslinking process.

A surprising feature of the invented compositions is the fact that the polymers are crystalline and also subject to crosslinking of the benzocyclobutane moiety without complete loss of such crystallinity. By this is meant that the crystal energy in J/g as measured by differential scanning calorimetry should be at least 5, preferably at least 7.5, thereby indicating a measurable crystalline structure, even after crosslinking. Thus the polymers after crosslinking retain good solvent resistance and high melting point, and also demonstrate enhanced elastic modulus in the melt. Accordingly the polymers are more useful for certain applications such as blow molding, film formation, etc. than crystalline polymers generally.

Having described the invention, the following examples are provided as further illustrative and are not to be construed as limiting.

EXAMPLE 1

Preparation of Homopolymer of 4-vinyl-benzocyclobutene by Bulk Polymerization

In argon atmosphere glovebox, a dry 20 ml vial was charged with 10 ml of 4-vinylbenzocyclobutene, 1.38 ml of a 0.5M solution of polymethyl-aluminoxane in toluene and 1.38 ml of a 1.0M solution of triisobutylaluminum in toluene. The vial was sealed with a teflon lined rubber septa and an aluminum seal cap. This solution was placed into a 70° C. water bath for 15 minutes, followed by adding 0.69 ml of a 0.01M solution of pentamethylcyclopentadienyl titanium triphenoxide complex in toluene via syringe.

The reaction was allowed to proceed for 16 hours at 70° C., after which time the reaction was cooled and methanol was added to deactivate the catalyst components.

The resulting polymer was dried under vacuum at 100° C. for 8 hours.

Yield was 1.73 gm (19.2 percent). The polymer did not redissolve in aromatic (toluene) or chlorinated solvents except chlorinated aromatics at elevated temperatures As determined by Carbon 13 NMR analysis (in o-dichlorobenzene at 130° C.), the resultant copolymer had greater than 50 percent syndiotacticity.

EXAMPLE 2

Thermal Crosslinking of Polymer of Example 1

The homopolymer obtained in Example 1 was heated in o-dichlorobenzene in a Carbon 13 NMR tube for 6 hours at 160° C. to crosslink it. The product was precipitated out as a hard solid. The product did not go back into solution.

EXAMPLE 3

Preparation of Homopolymer of 4-vinyl-benzocyclobutene by Solution Polymerization In argon atmosphere glovebox, a dry 20 ml vial was charged with 5 ml of 4-vinylbenzocyclobutene, 5 ml of toluene, 100 microliters of a 1.0M solution of polymethyl-aluminoxane in toluene and 100 microliters of a 1.0M solution of triisobutylaluminum in toluene. The vial was sealed with a teflon lined rubber septa and an aluminum seal cap. This solution was placed into a 50° C. water bath for 15 minutes, followed by adding 50 microliters of a 0.01M solution of pentamethylcyclopentadienyl titanium triphenoxide complex in toluene via syringe.

The reaction was allowed to proceed for 8 hours at 70° C., after which time the reaction was cooled and methanol was added to deactivate the catalyst components.

The resulting polymer was slurred up in 50 ml of hexane, filtered and dried under vacuum at 90° C. for 8 hours.

Yield was 0.59 gm (12 percent). The polymer did not redissolve in aromatic (toluene) or chlorinated solvents except chlorinated aromatics at elevated temperatures. As determined by Carbon 13 NMR analysis (in o-dichlorobenzene at 130° C.), the resultant copolymer had greater than 95 percent syndiotacticity.

EXAMPLE 4

Preparation of Copolymer of 4-vinyl-benzocyclobutene and Styrene by Bulk Polymerization In argon atmosphere glovebox, a dry 20 ml vial was charged with 9 ml of styrene, 1 ml of 4-vinylbenzocyclobutene, 200 microliters of a 1.0M solution of polymethyl-aluminoxane in toluene and 200 microliters of a 1.0M solution of triisobutylaluminum in toluene. The vial was sealed with a teflon lined rubber septa and an aluminum seal cap. This solution was placed into a 70° C. water bath for 20 minutes, followed by adding 100 microliters of a 0.01M solution of pentamethylcyclopentadienyl titanium triphenoxide complex in toluene via syringe.

The reaction was allowed to proceed for 6 hours at 70° C., after which time the reaction was cooled and methanol was added to deactivate the catalyst components.

The resulting polymer was dried under vacuum at 100° C. for 18 hours.

Yield was 1.58 gm (17.5 percent). The polymer did not redissolve in aromatic (toluene) or chlorinated solvents except chlorinated aromatics at elevated temperatures. As determined by Carbon 13 NMR analysis (in o-dichlorobenzene at 130° C.), the resultant copolymer had greater than 90 percent syndiotacticity. The copolymer had a number average molecular weight (Mn) of 143,000, a weight average molecular weight (Mw) of 812,000 and a molecular weight distribution (Mw/Mn) of 5.68.

EXAMPLE 5

Thermal Crosslinking of Polymer of Example 4

The copolymer obtained in Example 4 was heated in an oven for 16 hours at 185° C. to crosslink it. The sample was then placed into a bottle containing o- dichlorobenzene and heated to 130° C. to attempt to dissolve it. The copolymer did not dissolve into solution.

The hot mixture was filtered, washed with warm toluene and dried. Ninety-nine (99) percent of the material that was initially thermally treated were isolated. The isolated material was washed with dichlorobenzene and toluene and then a large excess of methanol was added to the mixture to precipitate any soluble homopolymer of styrene. No polymer was observed. This procedure proves that the isolated material was a cross-linked copolymer.

Comparison—Styrene Homopolymer

When a styrene homopolymer prepared in a manner similar to that shown in Example 1, is thermally treated as described in Example 2, the homopolymer will dissolve in o-dichlorobenzene when heated to 130° C.

EXAMPLE 6

Preparation of Catalyst

In a flask, 0.10 gm of pentamethylcyclopentadienyltitanium trimethyl was added to a suspension of 0.343 gm of tri(ethyl)ammonium tetra(pentafluorophenyl)boron in 10 ml of toluene at room temperature. The obtained mixture was allowed to stir for 10 hours, and then heated to 45° C. for one hour. No precipitate was observed since the mixture was a very dark solution. The toluene solvent was stripped off in-vacuo thereby leaving a black solid. This solid was washed 3 times with 5 ml of petroleum ether and dried in-vacuo. The product had the structure of the formula:

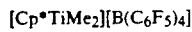

EXAMPLE 7

In an Argon glovebox, a dry 20 ml vial is charged with 16.0 mg (0.018 m mol) of the complex prepared in Example 6 followed by 10 ml (69.2 m mol) of 4-vinyl benzocyclobutene. The vial was sealed with a teflon lined rubber septum and an aluminum seal cap. This vial was shaken to dissolve the black complex, then placed into a 70° C. water bath. The reaction was allowed to proceed for 16 hours, after which time the reaction was cooled and methanol was added to deactivate the catalyst.

The resulting polymer was filtered and dried under vacuum at 90° C. for 12 hours. The yield was 1.99 gm (22.1%). The polymer did not redissolve in aromatic (toluene) or chlorinated solvents except chloranated aromatics at elevated temperatures similar to that seen earlier for polymers having greater than 50% syndiotacticity.

EXAMPLE 8

In an Argon glovebox, a dry 20 ml vial is charged with 16.0 mg (0.018 m mol) of the complex prepared in Example 6 followed by 9 ml (78.7 m mol) of styrene and 1 ml (6.9 m mol) of 4-vinyl benzocyclobutene. The vial was sealed with a teflon lined rubber septum and an aluminum seal cap. This vial was shaken to dissolve the black complex, then placed into a 70° C. water bath. The reaction was allowed to proceed for 16 hours, after which time the reaction was cooled and methanol was added to deactivate the catalyst.

The resulting copolymer was filtered and dried under vacuum at 90° C. for 12 hours. The yield was 1.73 gm (19.1%). The copolymer did not dissolve in aromatic (toluene) or chlorinated solvents except chlorinated aromatics at elevated temperatures similar to that seen earlier for polymers having greater than 50% syndiotacticity.

What is claimed is:

1. A crystalline copolymer having a stereoregular structure of greater than 50 percent syndiotactic comprising the coordination polymerized reaction product of at least one monomer corresponding to the formula:

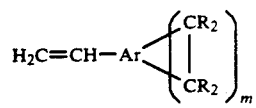

wherein Ar is an aryl moiety having adjacent ring carbons thereof covalently bonded to one or more 1,2-ethanediyl or substituted ethanediyl groups; R is hydrogen, an electron donating moiety or an electron-withdrawing moiety; and m is an integer of at least 1; and one or more vinylaromatic monomers.

2. A copolymer of claim 1 wherein the at least one monomer is represented by the formula:

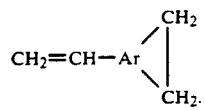

3. A copolymer of claim 2, wherein the at least one monomer is represented by the following formula:

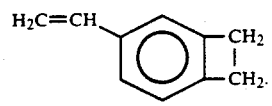

4. A copolymer of claim 1, wherein the vinyl aromatic monomers are represented by the formula:

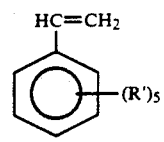

wherein each R' is independently hydrogen; an aliphatic, cycloaliphatic or aromatic hydrocarbon group having from 1 to 10 carbon atoms; or a halogen atom.

5. A copolymer of claim 4, wherein each occurrence of the vinylaromatic monomer is styrene.

6. A process for preparing a crystalline copolymer having a stereoregular structure of greater than 50 percent syndiotactic which comprises contacting at least one monomer corresponding to the formula:

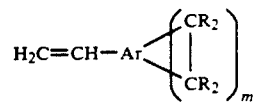

wherein Ar is an aryl moiety having adjacent ring carbons thereof covalently bonded to one or more 1,2-ethanediyl or substituted ethanediyl groups; R is hydrogen, an electron donating moiety or an electron-withdrawing moiety; and m is an integer of at least 1; and one or more vinylaromatic monomers under coordination polymerization reaction conditions in the presence of a catalytically effective amount of a catalyst comprising a transition metal compound and a polyalkylaluminoxane or a compound represented by the formula:

$$CpMX_n^+ A^-$$

wherein:

Cp is a single $\eta^5$-cyclopentadienyl or $\eta^5$-substituted cyclopentadienyl group optionally covalently bonded to M through a substituent;

M is a metal of Group IIIB, IVB, VB, VIB, VIII or the Lanthanide Series of the Periodic Table bound in an $\eta^5$ bonding mode to the cyclopentadienyl or substituted cyclopentadienyl group;

X is independently each occurrence halo, alkyl, aryl, $N-R_2$, aryloxy or alkoxy of up to 20 carbons;

R is alkyl or aryl of up to 10 carbons;

n is one or two depending on the valence of M; and

A is a noncoordinating, compatible anion of a Bronsted acid salt.

7. A process of claim 6, wherein the polymerization is conducted at a temperature of from 0° C. to 120° C.

8. A process of claim 6, wherein the polymerization is conducted for 5 minutes to 20 hours.

9. A process of claim 6, wherein the copolymerization is conducted in the presence of a solvent selected from toluene, iso-octane, iso-nonane, hexane, heptane or a mixture thereof.

10. A process of claim 6, wherein the at least one monomer is a vinylbenzocyclobutene.

11. A process of claim 10, wherein the at least one monomer is represented by the formula:

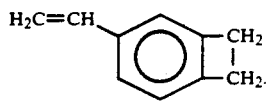

12. A process of claim 6, wherein the vinylaromatic monomer is represented by the formula:

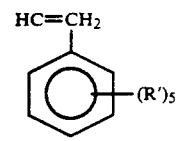

wherein each R' is independently hydrogen; an aliphatic, cycloaliphatic or aromatic hydrocarbon group having from 1 to 10 carbon atoms; or a halogen atom.

13. A process of claim 12, wherein the vinylaromatic monomer is styrene.

14. A crosslinked crystalline polymer prepared by subjecting a mixture comprising the copolymer of claim 1 to a temperature suitable for crosslinking the copolymer.

15. A crosslinked crystalline polymer of claim 14 wherein the crosslinking is effected at from 100° C. to 320° C.

16. A crosslinked crystalline polymer according to claim 14 wherein the mixture additionally comprises a composition capable of undergoing addition polymerization under ring-opening conditions.

17. A composition prepared by subjecting a mixture comprising the crystalline copolymer of claim 1 and another polymerizable component to a temperature suitable for crosslinking the polymer.